(12) United States Patent
Hasegawa et al.

(10) Patent No.: US 6,827,891 B2
(45) Date of Patent: Dec. 7, 2004

(54) METHOD FOR PRODUCTION OF FOAMED PLASTICS

(75) Inventors: Tadashi Hasegawa, Nagoya (JP); Takashi Korenaga, Nishinomiya (JP)

(73) Assignee: Shiraishi Central Laboratories Co., Ltd., Hyogo (JP)

( * ) Notice: Subject to any disclaimer, the term of this patent is extended or adjusted under 35 U.S.C. 154(b) by 234 days.

(21) Appl. No.: 10/162,278

(22) Filed: Jun. 4, 2002

(65) Prior Publication Data

US 2002/0185769 A1 Dec. 12, 2002

(30) Foreign Application Priority Data

Jun. 6, 2001 (JP) ........................................ 2001-170344

(51) Int. Cl.[7] .............................................. B29C 44/02
(52) U.S. Cl. ........................ 264/45.3; 264/51; 264/53
(58) Field of Search ..................... 264/45.3, 51, 53, 264/45.9

(56) References Cited

U.S. PATENT DOCUMENTS

| | | | | |
|---|---|---|---|---|
| 4,049,760 A | * | 9/1977 | Lozach | 264/51 |
| 4,312,958 A | * | 1/1982 | DiGiulio et al. | 521/88 |
| 5,334,336 A | * | 8/1994 | Franz et al. | 264/45.3 |

* cited by examiner

*Primary Examiner*—Allan R. Kuhns
(74) *Attorney, Agent, or Firm*—Cooper & Dunham LLP; Donald S. Dowden

(57) ABSTRACT

The object of the present invention is to provide a plastic molded material having uniform foamed structure at a low price. To attain said object, a method comprising; mixing particle containing 30 to 70% by weight of water in thermoplastic resin, heating and melting said thermoplastic resin in which said particles containing water are mixed under a high pressure, releasing said high pressure to form foamed structure and cooling to solidify said foamed thermoplastic resin.

7 Claims, 2 Drawing Sheets

1: melting mixer of the injection molding machine
2: cylinder   3: screw   4: hopper   5: nozzle
6: mold   7: mixture 1: melting mixer of the injection molding machine
2: cylinder   3: screw   4: hopper   5: nozzle
6: mold   7: mixture

METHOD FOR PRODUCTION OF FOAMED PLASTICS

FIELD OF THE INVENTION

The present invention relates to a method for production of foamed plastics. More precisely, the present invention relates to a method for production of foamed plastics comprising adding particles containing 30 to 70% by weight of water in thermoplastic resin, mixing, heating and melting said thermoplastic resin in which said particles have been added at high pressure, then releasing said high pressure affecting on the resulting mixture to foam said mixture of said thermoplastic resin and said particles, and cooling said foamed mixture.

DESCRIPTION OF THE PRIOR ART

Up to now, the chemical foaming method wherein a chemical blowing agent which generate gas when decomposed or a solvent having a low boiling point is mixed in a synthetic resin to make expand said synthetic resin foam by heating or the mechanical foaming method wherein air is mixed in synthetic resin by stirring have been provided. Further, the capsule method wherein a blowing microcapsule in which a solvent having a low boiling point is encapsulated is mixed in synthetic resin and heated and foamed has been also provided.

In said chemical foaming method or said mechanical foaming method, it is difficult to make uniform foamed structure and further in the chemical foaming method, the chemical blowing agent is expensive, and in the capsule method, the microcapsule is very expensive.

SUMMARY OF THE INVENTION

Accordingly, an object of the present invention is to provide foamed plastics having uniform foamed structure.

Another object of the present invention is to provide a method wherein said foamed plastics having uniform foamed structure can be produced economically.

Said object can be attained by a method for production of foamed plastics comprising adding particles containing 30 to 70% by weight of water in thermoplastic resin, mixing, heating and melting said thermoplastic resin in which said particles have been added at high pressure, then releasing said high pressure affecting on the resulting mixture to foam said mixture of said thermoplastic resin and said particles, and cooling said foamed mixture.

It is preferable that the average diameter of said particles containing the water is 30 to 200 $\mu$m and 0.1 to 5 parts by weight of said particles are added in 100 parts by weight of said thermoplastic resin and said particle containing the water is a porous particle of a synthetic resin. Said porous particle of synthetic resin is preferably produced by dispersing the water with a surface active agent in an oil phase which is a mixture of an unsaturated polyester and a vinyl monomer which can react with said unsaturated polyester to form cross linking to prepare an emulsion, and re-dispersing said emulsion in the water and curing said mixture to form cross linking.

Further said particle containing the water is also a porous inorganic particle.

It is also preferable that said thermoplastic resin and said particles containing the water are heated, melted and mixed in a cylinder of a melting mixer, and said high pressure affecting said melted mixture is released by extruding said melted mixture from the nozzle or the die which is attached at the tip of said melting mixer to foam and cool said melted mixture and said melting mixer is preferably that of an injection molding machine and said melting mixer's nozzle is connected to a mold, and said melted mixture is injected into said mold to be released from said high pressure and to be cooled and said high pressure is preferably set at 5 MPa and over and further releasing of said high pressure affecting said melted mixture is carried out at or below the pressure of the atmosphere is preferably.

In the present invention, it is easy to mix said particles containing water uniformly in the melting thermoplastic resin. In particular, uniform mixing of said particles in said melting thermoplastic resin is very easily carried out when said melting thermoplastic resin is mixed with said particles by the screw in the cylinder of said melting mixer When the high pressure affecting said melting thermoplastic resin in which said particles are mixed is released to put said melting thermoplastic resin preferably under the pressure of the atmosphere or below, the water contained in said particles evaporate quickly to form the foamed structure in said thermoplastic resin and said foamed structure is fixed by cooling. In the case where the water content of said particle is below 30% by weight, it is hard to form the foamed structure in said thermoplastic resin and in the case where the water content of said particle is beyond 70% by weight, the foamed structure becomes so coarse that said foamed structure may collapse. In the case where the pressure is set to be higher than 5 MPa, a large difference of the pressure is ensured when said pressure is released so that the smooth foaming by the sudden evaporation of the water is preformed.

DETAILED DESCRIPTION AND PREFERRED EMBODIMENTS

Figure 1:
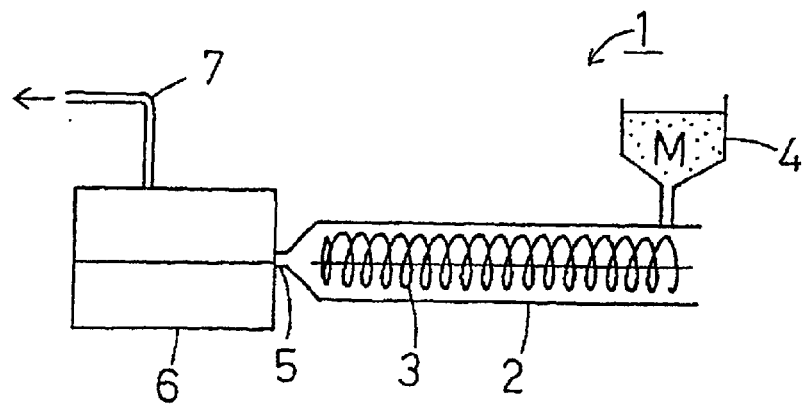
FIG. 1 is a drawing for illustration of the melting mixer of the injection molding machine used in EXAMPLE 2.

The invention is explained below
[Thermoplastic Resin]

Thermoplastic resins generally used in the present invention are such as polypropylene, polyethylene, polystyrene, polyester, poly (vinyl chloride), acrylonitrile-butadiene-styrene resin and the like.

Further, styrene type elastomer such as styrene-butadiene-styrene copolymer, styrene-isoprene-styrene copolymer, styrene-ethylene-butadiene-styrene copolymer and the like may be used in this invention as thermoplastic resin, wherein the styrene type elastomer contains block copolymer styrene type elastomer such as butadiene-styrene block copolymer, styrene-rubber segment-styrene block copolymer and the like. Furthermore, engineering plastics such as polyamide, polyacetal, polycarbonate, poly (ethylene terephthalate), poly (butylene terephthalate), polysulfone, poly (ethersulfone), poly (phenylene oxide), poly (phenylene sufide), polyarylate, poly (etheretherketone), polyamideimide, polyimide, poly (etherimide), poly (aminobismaleimide), methyl pentene copolymer, polyaminobismaleimide, bismaleimide-triazine type thermosetting aromatic polyimide and the like, biodegradable resin such as mixture of starch and modified poly (vinyl alcohol), mixture of chitosan and cellulose, mixture of starch and polycaprolactam, mixture of starch and polyethylene, microorganism productive polyester and the like may be used in this invention as thermoplastic resin.

[Particle Containing Water]

Particle containing water used in the present invention are such as synthetic resin porous particle such as polystyrene porous particle, polymethacrylate porous particle, polyethylene porous particle, polypropylene porous particle, polyester resin porous particle, polyamide resin porous particle, phenol resin porous particle, melamine resin porous particle, epoxy resin porous particle, urethane resin porous particle and the like, ceramics porous particle such as glass porous particle, silas ballon, zeolite porous particle, calcium carbonate porous particle, barium sulfate porous particle, silica porous particle, alumina porous particle, zirconia porous particle, titania porous particle and the like, hygroscopic inorganic porous particle such as silica gel, zeolite, calcium chloride porous particle, magnesium chloride porous particle, silicate porous particle, diatomite and the like, water absorbent polyacrylic acid type resin particle, water absorbent starch type resin particle and the like.

A preferred method to produce said porous particle of polyester resin comprises producing W/O type emulsion by dispersing and emulsifying water in an oil phase that is a mixture of unsaturated polyester and vinyl monomer which can react with said unsaturated polyester to produce cross-linking by using surface active agent and re-dispersing the resulting emulsion and at the same time curing said mixture to produce cross-linking.

Emulsifies used above described are such as water-soluble polyamine, nonionic, anionic and cationic surface-active agent, oxide of alkaline-earth metals such as magnesium oxide, calcium oxide, barium oxide, strontium oxide, hydroxide of alkaline-earth metals such as magnesium hydroxide, calcium hydroxide, barium hydroxide, strontium hydroxide and the like.

The unsaturated polyester mentioned above is a condensation resin comprises α, β-unsaturated fatty acid (or mixture of the α, β-unsaturated fatty acid and saturated fatty acid) and dihydric or trihydric alcohol. Vinyl type monomers being capable of cross-linking reaction with the α, β-unsaturated fatty acid are such as styrene, chlorostyrene, vinyltoluene, divinylbenzene, acrylic acid, methyl acrylate, ethyl acrylate, butyl acrylate, metyl methacrylate, acrylronitrile, vinyl acetate, diallyl phthalate and the like. An added amount of said vinyl type monomer is about 50 to 200 parts by weight for 100 parts by weight of said α, β-unsaturated fatty acid.

An added amount of said emulsifier is about 0.01 to 20 parts by weight for 100 parts by weight of said oil phase and said emulsifier may be added in said oil phase or in water which is added in said oil phase or in both of them and in the case where said oxide or hydroxide of alkaline earth metals is used as an emulsifier, said emulsifier is preferably suspended in water added in said oil phase.

The amount of water added in said oil phase is about 10 to 600 parts by weight, preferably about 50 to 400 parts by weight for 100 parts by weight of said oil phase.

In order to cure said unsaturated polyester with said vinyl monomer to produce cross-linking, initiators to polymerize said unsaturated polyester can be used. Said initiators are such as organic peroxide initiator such as benzoyl peroxide, methyethylketone peroxide, cumene peroxide, t-butyl peroxide and the like, initiator inorganic peroxide such as ammonium persulfate, sodium persulfate, potassium persulfate and the like, redox system polymerization initiator such as methylethylketone peroxide-cobalt organic acid salt, cumene hydroperoxide-cobalt organic acid salt and the like. Said initiator may be added in said oil phase. Further in the case of redox initiator consisting of two components, one component may be added in said oil phase and the other component may be added in said re-dispersion. There is no limitation on the amount of said initiator to be used, but commonly 0.5 to 5 parts by weight of said initiator may be added in 100 parts by weight of said oil phase.

Further, there is no limitation on polymerization temperature but commonly said polymerization temperature may be 10 to 40° C.

Water content of said particle containing water must be 30 to 70% by weight and in the case where water content of said particle is below 30% by weight, foamed structure is hard to form and in the case where water content of said particle is beyond 70% by weight ratio, foamed structure becomes too coarse, resulting in a break down.

The diameter of said particle containing water is preferably 30 to 200 $\mu$m. In the case where the diameter of said particle is below 30 $\mu$m, foamed structure may become too fine and lightweight of foamed plastic cannot be attained while in the case where the diameter of said particle is beyond 200 $\mu$m, foamed structure may become too coarse resulting in degradation of the mechanical strength and ruin of the appearance of said foamed plastics.

[Other Components]

In addition to the components, inorganic filer such as calcium carbonate, magnesium carbonate, barium carbonate, calcium phosphate, calcium hydroxide, magnesium hydroxide, aluminum hydroxide, magnesium oxide, titanium oxide, iron oxide, zinc oxide, alumina, silica, dolomite, gypsum, talc, clay, asbestos, mica, glass fiber, calcium silicate, bentonite, white carbon, iron powder, aluminum powder, powdered feldspar, blast furnace slag, fly ash, cement, zirconia powder and the like, organic filer such as linter, linen, sisal, coconut powder, walnut powder, starch, wheat flour, paper powder, bamboo powder, wood powder, a chip of wood, woody fiber, wood pulp, bagasse, chaff, rice straw and the like, natural fiber such as cotton, hemp, bamboo fiber, coconut fiber, strained sugarcane lees, wool, silk and the like, organic synthetic fiber such as polyamide fiber, polyester fiber, acrylic fiber, viscose fiber, acetate fiber, vinyl chloride fiber, vinylidene chloride fiber and the like, inorganic fiber such as asbestos fiber, glass fiber, carbon fiber, ceramics fiber, metal fiber, whisker, powder of these fiber, product collected scrap of used paper or fiber product, dye, pigments, antioxidant, plasticizer, flame retardant, ultraviolet absorber and the like may be added to the thermoplastic resin in the present invention.

[Production of Foamed Plastics]

In the present invention, said particles containing water are added commonly in an amount between 0.1 to 5 parts by weight for 100 parts by weight of said thermoplastic resin. In the case where an added amount said particles containing water is below 0.1 parts by weight, expansion ratio may become too low and lightweight of said foamed plastics cannot be sufficiently attained.

Further, in the case said added amount of said particles containing water is beyond 5 parts by weight, said expansion ratio may become too high and the mechanical strength of said foamed plastics may degrade and besides it is feared that the appearance of said foamed plastics mold becomes inferior.

Water is impregnated into said particles commonly until said water is saturated in said particles excepting inorganic compounds containing water of crystallization, and then said thermoplastic resin and said particles impregnated with said water are charged in a pressure vessel with a stirrer or in the cylinder of a uniaxial or a biaxial or multiaxial melting mixer, and the like, to be mixed and melted with heating at temperature higher than the melting point of said thermoplastic resin. In the case of said inorganic compounds containing said water of crystallization, said inorganic compounds are charged without being impregnated with water.

Said particles are dispersed uniformly in said melted thermoplastic resin by stirring effect of a stirrer or a screw under high pressure preferably between 10 MPa and 50 MPa.

The resulting mixture is then released from high pressure to be put preferably at or below the pressure of the atmosphere, following which the water contained in said particles dispersing uniformly in said melted thermoplastic resin is vaporized quickly or said water of crystallization in said inorganic compound is isolated and vaporized quickly, producing foamed structure in thermoplastic resin.

Said thermoplastic resin in which foamed structure is produced is then cooled to fix said foamed structure.

In the case where said mixture is charged in said pressure vessel, the vessel's inner pressure is restored to ordinary atmospheric pressure, or is reduced and said vessel is cooled. In this case, said mixture in said vessel is expanded, cooled and solidified to form block shaped foamed thermoplastic resin mold and in compliance with your request said block shaped foamed mold is sliced to be panel shaped. In the case where said melted mixture is extruded from the nozzle of said melting mixer, at an instant said melted mixture is extruded, it is released from high pressure and cooled to form strap or bar or panel shaped foamed mold and at your request, said strap or bar or panel shaped foamed mold is cut into pellets in preferable length.

In the case where said melted mixture is extruded from the die of said melting mixer, said melted mixture form a pipe shaped foamed mold, a sheet shaped foamed mold, a panel shaped foamed mold or a bar shaped foamed mold depending on the shape of die, and at your request said foamed mold is cut in preferable length. Said melted mixture may be extruded from the nozzle or the die of said melting mixer in a cooling chamber in which pressure is reduced. In the case where the nozzle of said melting mixer is connected to a mold, said melted mixture is expanded and cooled and fixed in the cavity of said mold to form a foamed mold having a shape corresponding to the shape of the cavity.

A plural number of bent holes may be formed in the interior of the cavity to affect reduced pressure in the cavity through said bent holes.

The resulting foamed plastics produced by the above described method has a uniform foamed structure and is useful as panel shaped composite lumber, foamed pipes, foamed railings, insulation, materials, soundproof materials, cushion materials, packing materials, car parts of large scale, concrete panels, u-shaped ditches for cable wiring, cover of u-shaped ditches, housings of home electric appliances of large scale such as TV cabinets and the like, home utensils, gardening utensils, and the like.

EXAMPLE 1
(Production of Foamed Polyester Resin Particle Containing Water)

70 parts by weight of saturated polyester resin [the trade name; Epolac N-14B, acid value 12, styrene content: 30% by weight, Nippon Shokubai Co., Ltd.], 30 parts by weight of styrene, and 0.5 parts by weight of cobalt naphthenate (cobalt content; 6% by weight) were mixed by stirring at a circuit speed of 20 m/sec using a disper type stirrer and then an aqueous suspension of strontium hydroxide [chemical agent, Mitsuwa Chemical Co.] wherein 1 part by weight of strontium hydroxide was added in 200 parts by weight of water and mixed with a ball mill for 5 hours, was added to said mixture little by little during the course of mixing for five hours to prepare a W/O type emulsion. Then the resulting emulsion was added in a mixture of 160 parts by weight of 3.5% by weight aqueous solution of polyvinyl alcohol [viscosity average molecular weight 2000, saponification value 80% Wako Pure Chemical Industries Ltd.] and 90 parts by weight of 2% by weight aqueous solution of hydroxyethyl cellulose (the trade name; Natrosol 250-HHR, Hercules Incorporated) and was mixed by stirring at a circuit speed of 5 m/sec for 10 minutes using a propeller type stirrer and further 3 parts by weight of methyl ethyl ketone peroxide [the trade name; KayamecA, purity 55% by weight, Kayaku Akzo] was added with stirring at a circuit speed of 2 m/sec for 2 hours at 30° C. to produce white coloured slurry of porous cross-linked polyester particle wherein a unsaturated polyester layer was cross-linked. The resulty polyester particle was washed and filtered and the resulting cake was dried at 80° C. for 1 hour to prepare a porous polyester particle having an average diameter of 20 μm and containing 45% by weight of water.

EXAMPLE 2

A melting mixer (1) of the injection molding machine shown in FIG. 1 consists of a cylinder (2), a screw (3), installed in said cylinder (2), and a hopper(4) connecting with the root of said cylinder (2) into which the raw materials are put and the ratio of the length L and the diameter D (L/D) of said cylinder (2) is set to be in the range between 20 to 40. The tip nozzle (5) of said cylinder (2) connects with a mold. A large numbers of vents are formed in the inner surface of the cavity of said mold (6) and the reduced pressure is introduced in said cavity through a vacuum system (7) via said vents.

A mixture M of 100 parts by weight of polypropylene resin and 1 part by weight of said polyester resin porous particles prepared in EXAMPLE 1 was put into said cylinder (2) through said hopper (4) and heated at 180° C. to melt said polypropylene resin, and as said melted polypropylene resin was mixed uniformly with said polyester resin porous particles by means of said rotating screw (3), said polypropylene resin was carried forward.

Figure 3:
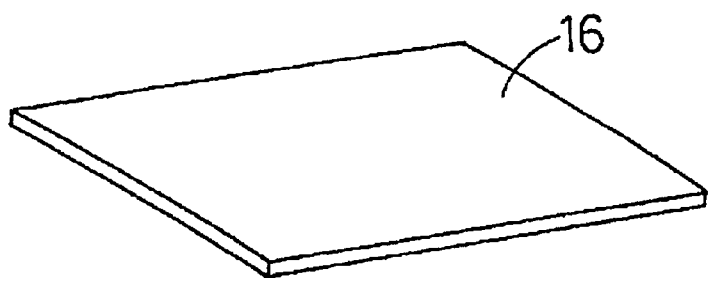
FIG. 3 is a perspective view of the panel produced in EXAMPLE 3.

Counterforce against the pressure of said melting resin advancing was added to said screw (3) with an oil pressure cylinder, etc. which are not shown in FIG. 3, keeping said melted resin under a high pressure of 40 MPa.

Said mixture was injected into said mold (6) through said nozzle (5) and the reduced pressure of 41 KPa was introduced in the cavity of said mold (6) through said vacuum system (7). Said mixture was foamed by rapid evaporation of water contained in said polyester resin porous particles and was cooled to be solidified in said cavity of said mold (6). The expansion ratio of the resulting foamed polypropylene molded material was about 1.5 times and had uniform foamed structure said material is useful as a car bumper, an instrument panel of a car, door trim of a car, and housings of home electric appliances etc.

EXAMPLE 3

A mixture of 100 parts by weight of polypropylene resin and 0.8 parts by weight of polystyrene porous particles containing 50% by weight of water (average particle size 25 μm) was used to produce a foamed polypropylene molded material by the same method as described in EXAMPLE 2. The expansion ratio of the resulting foamed molded material was about 1.7 times and said foamed molded material uniform foamed structure. Said material is useful as the same resin product as EXAMPLE 2.

EXAMPLE 4

A mixture of 100 parts by weight of polypropylene resin and 1 part by weight of porous phenol resin particles containing 40% by weight of water (average particle size 20 μm) was used to produce a foamed polypropylene molded material by the same method as described in EXAMPLE 2.

The expansion ratio of the resulting foamed molded material was about 1.5 times and said foamed molded material had uniform foamed structure. Said material is useful as the same resin product as EXAMPLE 2.

EXAMPLE 5

Figure 2:
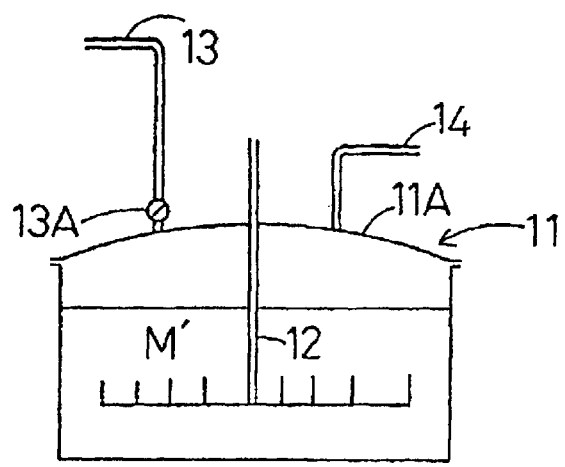
FIG. 2 is a drawing for illustration of the pressure vessel used in EXAMPLE 3.

The pressure vessel (11) equipped with the stirrer (12) shown in FIG. 2 is connected with the pressure system (13) and the vacuum system (13). A mixture M' of 100 parts by weight of polystyrene pellets and 2 parts by weight of silicagel particles containing 65% by weight of water (average particle size 50 μm) was charged into said pressure vessel (11) and the lid (11A) of said vessel (11) was shut tightly the valve (13A) was opened to affect a high pressure of 30 MPa in said vessel (11) through the pressure system (13) and said mixture M' was heated at 150° C. and mixed.

When said particles were dispersed uniformly in said melted polystyrene, said high pressure was released and instantly the reduced pressure of 48 KPa was introduced in said vessel (11) through said vacuum system (14) and at the same time said mixture M' was cooled to evaporate quickly water in said silicagel particles to form the foamed structure and was solidified.

Figure 4:
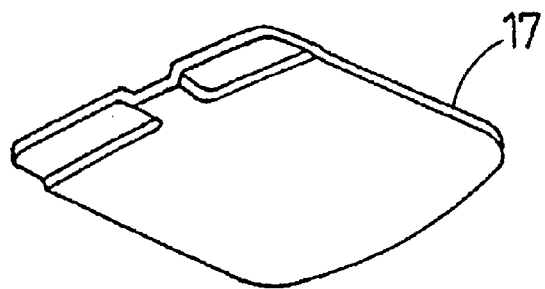
FIG. 4 is a perspective view of head lining of car produced from said panel.

The resulting foamed polystyrene block was sliced in panels (15) having desired thickness as shown in FIG. 3 and said panel (15) is used as a concrete panel, etc. and if desired said panel is heated to be softened at 130° C. and then molded by cold press molding in a desired shape to be car interior material such as base material of head lining (16), door trim, and the like as shown in FIG. 4. The expansion ratio of said foamed molded material was about 3 times and had uniform foamed structure.

EXAMPLE 6

A mixture of 100 parts by weight of polypropylene resin and 2 parts by weight of zeolite containing 35% by weight of water (average particle size 40 μm) was heated to be melted at a temperature between 180 to 200° C. and was mixed under a high pressure of 20 MPa in the extruder. And then while extruded in bar-shape from the dice of said extruder, said mixture was released from said high pressure to be foamed and was cooled to be solidified under the atmospheric pressure. The expansion ratio of the resulting foamed molded material having bar shape was 1.3 times. Said foamed molded material is cut in desired length and, is used as, for example banisters of a staircase, hand rails of a bath room, and/or a lavatory and the like.

EXAMPLE 7

A mixture of 100 parts by weight of ABS resin and 2.5 parts by weight of silas ballon (average particle size 80 μm) containing 40% by weight of water was heated to be melted at 180° C. and mixed under a high pressure of 25 MPa in the extruder and then while extruded in panel shape from the dice of said extruder, said mixture was released from said high pressure to be foamed and was cooled to be solidified under the atmospheric pressure. The expansion ratio of the resulting foamed molded material having panel shape was 1.5 times. Said foamed molded material is cut in a desirable size and is used as a floor panel, a shelf panel, a surface panel of furniture and the like, a base panel of a car interior and so on.

In the present invention, since particles containing water which are inexpensive and easily dispersed uniformly in the melted resin are used instead of an expensive chemical blowing agent and/or an expensive blowing capsule, water car disperse uniformly by being mediated by said particles, so that a plastic molded product having uniform foamed structure without sink can be produced inexpensively.

What is claimed is:

1. A method for production of foamed plastics comprising: adding particles containing 30 to 70% by weight of water in thermoplastic resin; mixing, heating and melting said thermoplastic resin in which said particles have been added at high pressure; then releasing said high pressure acting on the resulting mixture to foam said mixture of said thermoplastic resin and said particles; and cooling said foamed mixture, wherein the average diameter of said particles containing the water is 30 to 200 μm and 0.1 to parts by weight of said particles are added in 100 parts by weight of said thermoplastic resin, said particles containing the water are porous particles of a synthetic resin, and said porous particles of synthetic resin are produced by dispersing the water with a surface active agent in an oil phase which is a mixture of an unsaturated polyester and a vinyl monomer which can react with said unsaturated polyester to form cross-linking to prepare an emulsion, and re-dispersing said emulsion in the water and curing said mixture to form cross-linking.

2. A method for production of foamed plastics comprising adding porous particles of a polyester resin containing 30 to 70% by weight of water in thermoplastic resin; mixing, heating and melting said thermoplastic resin in which said particles have been added at high pressure; then releasing said high pressure to foam the resulting mixture of said thermoplastic resin and said particles, and cooling said foamed mixture, wherein said porous particles of a polyester resin are produced by dispersing the water with a surface active agent in an oil phase which is a mixture of an unsaturated polyester and a vinyl monomer which can react with said unsaturated polyester to form cross-linking to prepare an emulsion, and re-dispersing said emulsion in the water and curing said mixture to form cross-linking.

3. A method for production of foamed plastics in accordance with claim 2, wherein the average diameter of said particles containing the water is 30 to 200 μm and 0.1 to 5 parts by weight of said particles are added in 100 parts by weight of said thermoplastic resin.

4. A method for production of foamed plastics in accordance with claim 2, wherein said thermoplastic resin and said porous particles of a polyester resin containing the water are heated, melted and mixed in a cylinder of a melting mixer, and said high pressure is released by extruding said melted mixture from the nozzle or the die which is attached at the tip of said melting mixer to foam and cool said melted mixture.

5. A method for production of foamed plastics in accordance with claim 4, wherein said melting mixer is that of an injection molding machine and said melting mixer's has a nozzle connected to a mold, and then said melted mixture is injected through said nozzle into said mold to be released from said high pressure and to be cooled.

6. A method for production of foamed plastics in accordance with claim 2, wherein said high pressure is set at 5 MPa and over.

7. A method for production of foamed plastic in accordance with claim 2, wherein releasing of said high pressure affecting said melted mixture is carried out at or below the pressure of the atmosphere.

* * * * *